(12) United States Patent
Steinhorst et al.

(10) Patent No.: US 9,574,702 B2
(45) Date of Patent: Feb. 21, 2017

(54) MOUNTING SYSTEM FOR INSULATED INSTALLATIONS

(75) Inventors: Thomas Steinhorst, Argenbuehl-Ratzenried (DE); Harald Kuisle, Gestratz (DE); Stephan Moeller, Muenster (DE); Juergen Weidinger, Muenster (DE)

(73) Assignee: Armacell Enterprise GmbH & Co. KG, Schoenefeld OT Waltersdorf (DE)

( * ) Notice: Subject to any disclaimer, the term of this patent is extended or adjusted under 35 U.S.C. 154(b) by 0 days.

(21) Appl. No.: 13/352,504

(22) Filed: Jan. 18, 2012

(65) Prior Publication Data

US 2012/0181413 A1    Jul. 19, 2012

(30) Foreign Application Priority Data

Jan. 18, 2011 (EP) .................................. 11151209
May 27, 2011 (EP) .................................. 11167837

(51) Int. Cl.
*F16L 59/135* (2006.01)
*F16L 59/14* (2006.01)

(52) U.S. Cl.
CPC .............. *F16L 59/135* (2013.01); *F16L 59/14* (2013.01); *F16L 59/143* (2013.01)

(58) Field of Classification Search
CPC .......... F16L 59/135; F16L 59/14; F16L 59/12; F16L 59/143; F16L 59/147
USPC ............ 248/560, 562, 603, 636, 49, 65, 58, 55,248/74.1, 74.2, 74.3, 62; 138/149, 107, 112, 138/113; 285/47, 61, 64; 24/279, 284
See application file for complete search history.

(56) References Cited

U.S. PATENT DOCUMENTS

| | | | |
|---|---|---|---|
| 3,000,433 A | 9/1961 | Kemper | |
| 3,122,346 A | 2/1964 | Seiler | |
| 3,223,439 A * | 12/1965 | Stevens | F16L 21/002 285/373 |
| 3,889,715 A * | 6/1975 | Lilja | F16L 59/10 138/117 |
| 3,891,006 A * | 6/1975 | Lee | 138/106 |
| 4,071,311 A * | 1/1978 | Errington | F16L 59/12 138/149 |
| 4,134,563 A | 1/1979 | Pollono | |
| 4,140,483 A * | 2/1979 | Errington | F27D 3/02 138/149 |
| 4,170,451 A * | 10/1979 | Luff | F27D 3/022 138/147 |

(Continued)

FOREIGN PATENT DOCUMENTS

| | | |
|---|---|---|
| DE | 9102934 U1 | 5/1991 |
| DE | 9421307 U1 | 8/1995 |

(Continued)

OTHER PUBLICATIONS

European Search Report issued in European Appln. No. 11167837, dated May 25, 2012, 6 pages.

*Primary Examiner* — Jonathan Liu
*Assistant Examiner* — Guang H Guan
(74) *Attorney, Agent, or Firm* — Rothwell, Figg, Ernst & Manbeck, P.C.

(57) ABSTRACT

A system for fixing installations, such as pipes, tanks, vessels or ducts, with thermal and/or sound insulation, as well as the manufacturing and use of the system for fixing. The system for fixing installations exhibits easy mounting and fastening, and is suitable both as a system for providing pre-insulation as well as for being used on readily insulated installations.

11 Claims, 9 Drawing Sheets

(56) References Cited

U.S. PATENT DOCUMENTS

| | | | |
|---|---|---|---|
| 4,429,497 A * | 2/1984 | Dibernardi | F16L 3/04 248/65 |
| 4,709,886 A * | 12/1987 | Smart et al. | 248/49 |
| 4,804,158 A * | 2/1989 | Collins et al. | 248/74.4 |
| 4,852,831 A | 8/1989 | Sandstrom | |
| 5,078,346 A | 1/1992 | Deichman | |
| 5,181,319 A * | 1/1993 | Campbell, Jr. | 29/890.053 |
| 5,192,039 A * | 3/1993 | Williams | F16L 59/135 138/107 |
| 6,085,394 A | 7/2000 | Hartman | |
| 6,505,650 B2 * | 1/2003 | Bohon et al. | 138/149 |
| 6,505,865 B2 * | 1/2003 | Minemyer | F16L 17/04 285/328 |
| 6,575,412 B2 * | 6/2003 | Klezath | 248/58 |
| 6,755,218 B2 * | 6/2004 | Whitty | F16L 59/123 138/147 |
| 6,863,312 B1 * | 3/2005 | Liebst | 285/23 |
| 7,213,790 B2 * | 5/2007 | Bailey et al. | 248/65 |
| 7,472,870 B2 * | 1/2009 | Zagorski et al. | 248/65 |
| 7,546,986 B2 * | 6/2009 | Kim | F16L 3/1008 248/62 |
| 7,591,286 B2 * | 9/2009 | Howard | H02G 9/065 138/108 |
| 7,861,983 B2 * | 1/2011 | Lange | F16L 59/123 138/106 |
| 7,950,609 B2 * | 5/2011 | Pothanikat et al. | 248/65 |
| 8,381,361 B2 * | 2/2013 | Serna-Gongora | F16L 3/133 24/20 R |
| 2005/0145755 A1 * | 7/2005 | Yuuki | G02B 6/3887 248/49 |
| 2009/0095847 A1 * | 4/2009 | Lange et al. | 248/74.1 |
| 2009/0265895 A1 * | 10/2009 | Box | 24/20 R |
| 2010/0319839 A1 * | 12/2010 | Shumate | 156/165 |
| 2011/0309207 A1 * | 12/2011 | Senkpiel | 248/70 |
| 2012/0181413 A1 * | 7/2012 | Steinhorst | F16L 59/135 248/636 |

FOREIGN PATENT DOCUMENTS

| | | | |
|---|---|---|---|
| DE | 9421308 U1 | 8/1995 | |
| EP | 0503566 A1 | 9/1992 | |
| FR | 2239166 AS | 2/1975 | |
| GB | WO 2011018605 A1 * | 2/2011 | F16L 3/1075 |
| RU | 1133949 A1 | 6/1993 | |
| RU | 1606798 A1 | 11/1999 | |
| SU | 752112 A1 | 7/1980 | |
| WO | 99/18384 A1 | 4/1999 | |

* cited by examiner

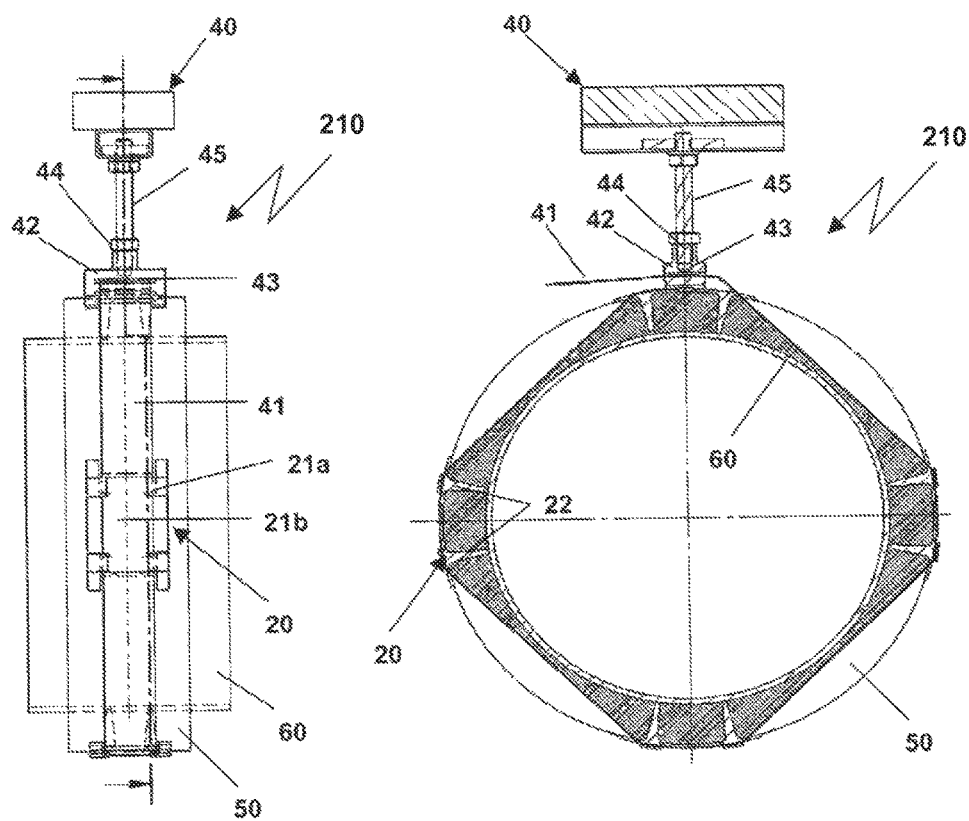

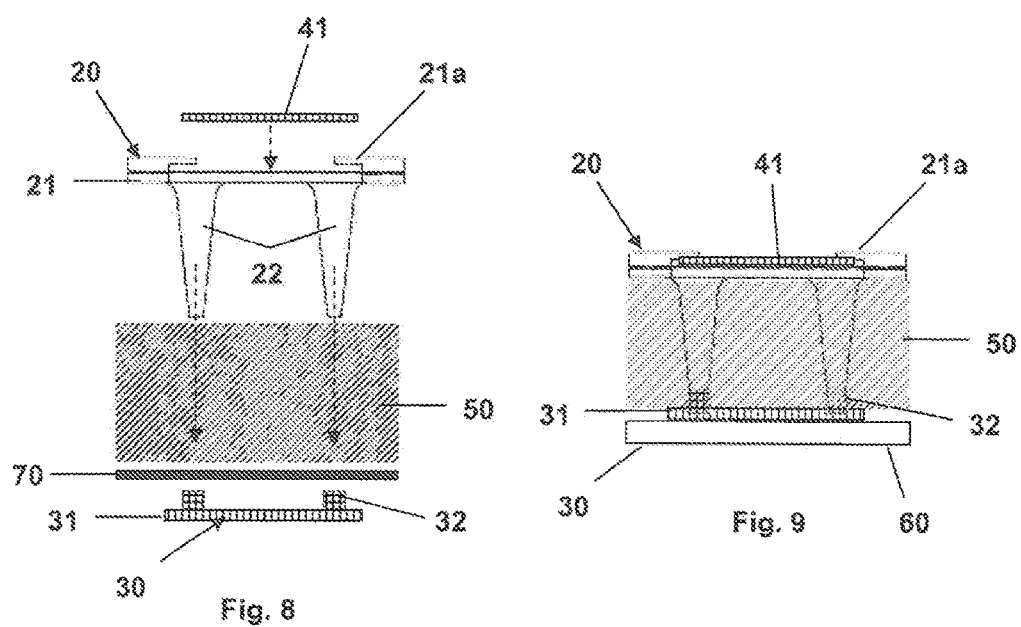

MOUNTING SYSTEM FOR INSULATED INSTALLATIONS

CROSS REFERENCE TO RELATED APPLICATIONS

This application claims priority from European Patent Application No. 11 151 209 filed on Jan. 18, 2011, and from European Patent Application No. 11 167 837 filed on May 27, 2011, all of which are incorporated herein by reference in their entireties for all purposes.

The present invention relates to a system for fixing pipes, tanks, vessels, ducts or installations in general with thermal and/or sound insulation exhibiting easy mounting and fastening, being suitable both as system providing pre-insulation as well as for being used on readily insulated installations, the manufacturing of such system and the use of such system.

Fixing systems for media pipes, vessels, tanks, ducts etc. are available in numerous varieties for all kinds of final use. Special problems, however, occur when it comes to fastening or fixing pre-insulated pipes or when generally trying to provide a fixing system that is also showing thermal and/or sound insulation properties. Some attempts have been made to overcome said issues. E.g. DE 94 21 308 describes a clamp on the pipe with two half-shell insulation elements covering the clamp, and DE 94 21 307 uses rigid hollow half-shell elements filled with insulation material that are fixed with a clamp on the outside. U.S. Pat. No. 4,852,831 discloses U-shaped members used for fixing a pipe through an optional insulation, U.S. Pat. No. 5,078,346 describes a suspension hanger where a support is holding the pipe through the insulation from underneath, similar elements but only from more sides had been used for U.S. Pat. No. 3,000,433 already.

The disadvantage of such systems is obvious: Firstly, the thread to fix the clamp to other installations often will need to penetrate the insulation or the rigid elements themselves will penetrate through the insulation and also lay on the pipe both with a high surface. These damages of the insulation will lead to leakage and loss of energy. Secondly, these configurations will definitely lead to condensation of humidity onto the pipe which will cause the feared corrosion under insulation (CUI or UIC), no matter how good the water vapour transmission (WVT) blocking properties of the insulation may be.

Other systems, such as in DE 91 02 934, try to improve the WVT related performance of bearer elements by applying the clamps on the outside and by letting the insulation material (which of course has to show some structural integrity, i.e. has to be rather rigid) bear the pipe. Distinguished by better WVT blocking indeed, such systems, however, show drawbacks in other fields. E.g., the rigidity of the system will lead to deficiencies both in easy mounting and in versatility, i.e. almost each diameter of pipe will require a dedicated fixing system. Additionally, the rigid insulation itself may undergo risk of cracking or breaking e.g. through vibration or other mechanical impact.

Most of the above-mentioned deficiencies are also valid for U.S. Pat. No. 3,122,346, which claims a system which is intended for being pierced through the insulation material based on a grid-like structured spacer. Generally, the compromise of high enough rigidity for achieving good stability and high enough flexibility for good mounting properties is not easy to match at all for such configurations. Additionally, such systems are not very economic as they need to be rather complex for the above-mentioned reasons.

A major object of the present invention thus is to provide a system not showing the above-mentioned deficiencies but exhibiting easy mounting properties, versatility in fixing various geometries and safety in application and use.

Surprisingly, it has been found that such system not showing the above mentioned disadvantages can be made comprising at least a series of fixation holders or hangers with special geometry adapted to the application and a device, e.g. a belt or ribbon connecting said fixations, and optionally an insulation material.

Hereinafter the present invention will be explained in a non-limiting manner by way of example by means of advantageous embodiments with reference to the accompanying drawings wherein FIG. 1 shows an exploded view of a first embodiment of a fixing system for an insulation according to the present invention;

FIG. 5 shows a side view of a second embodiment of the fixing system according to the present invention;

FIG. 6 shows a cross-section of the fixing system of FIG. 5;

FIG. 8 shows an exploded view of a cross-section of the arrangement of a counter plate in the fixing system;

FIG. 9 shows the cross-section of the arrangement of the counter plate of FIG. 8;

Figures 1, 2:
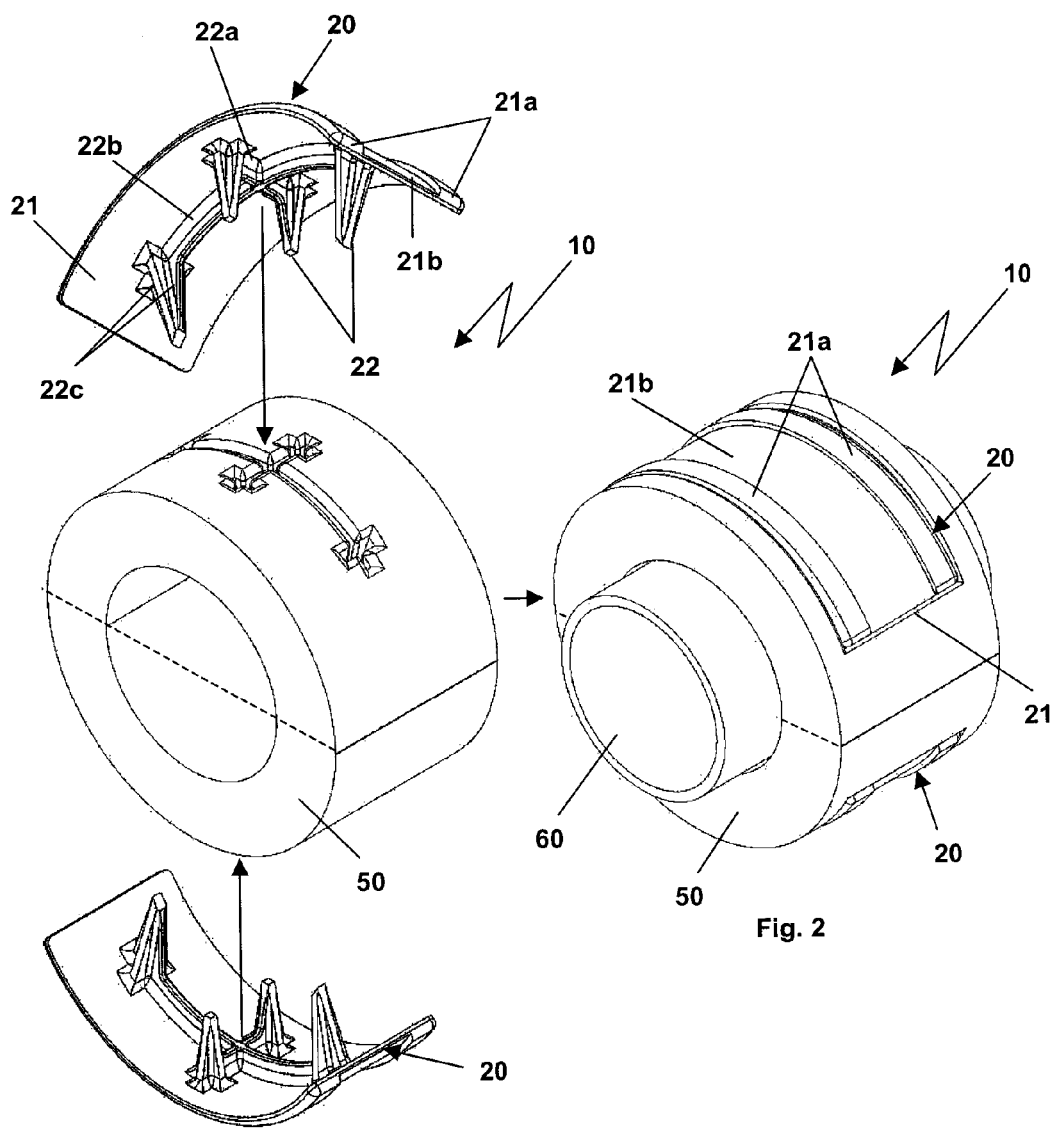
FIG. 2 shows a perspective view of the fixing system of FIG. 1 in an assembled state.

FIGS. 1 to 4 show the fixing system 10 comprising two curved base plate units 20 arranged on diametrically opposite sides of the outer surface of an insulation material 50 having an annular cross-section, the inner curvature radius of the base plate units 20 corresponding to the outer curvature radius of the insulation material 50.

The insulation material 50 is arranged on a pipe or installation 60 extending axially through and in contact with the insulation material 50.

The base plate unit 20 comprises a strip-like curved plate element 21 peripherally extending around the outer surface of the insulation material 50.

A central peripheral inner rib 22b is formed on the inner side of the plate element 21. Further at the peripheral middle portion of the peripheral rib 22b and the plate element 21 a shorter transversal rib 22a is formed on the inner surface of the plate element 21. The transversal rib 22a extends perpendicularly to the peripheral rib 22b.

At the outer surface of each spike 22 four reinforcing ribs 22c are formed at an angular distance of 90° such that the spikes 22 have a cross-shaped cross-section. The reinforcing ribs 22c and therefore the spikes 22 are tapering towards the free end of each spike 22.

At the outer surface of the plate element 21 peripherally extending lands 21a are formed along the opposite peripheral edges of the plate element 21 to form a peripherally extending groove 21b there between.

Figures 3, 4:
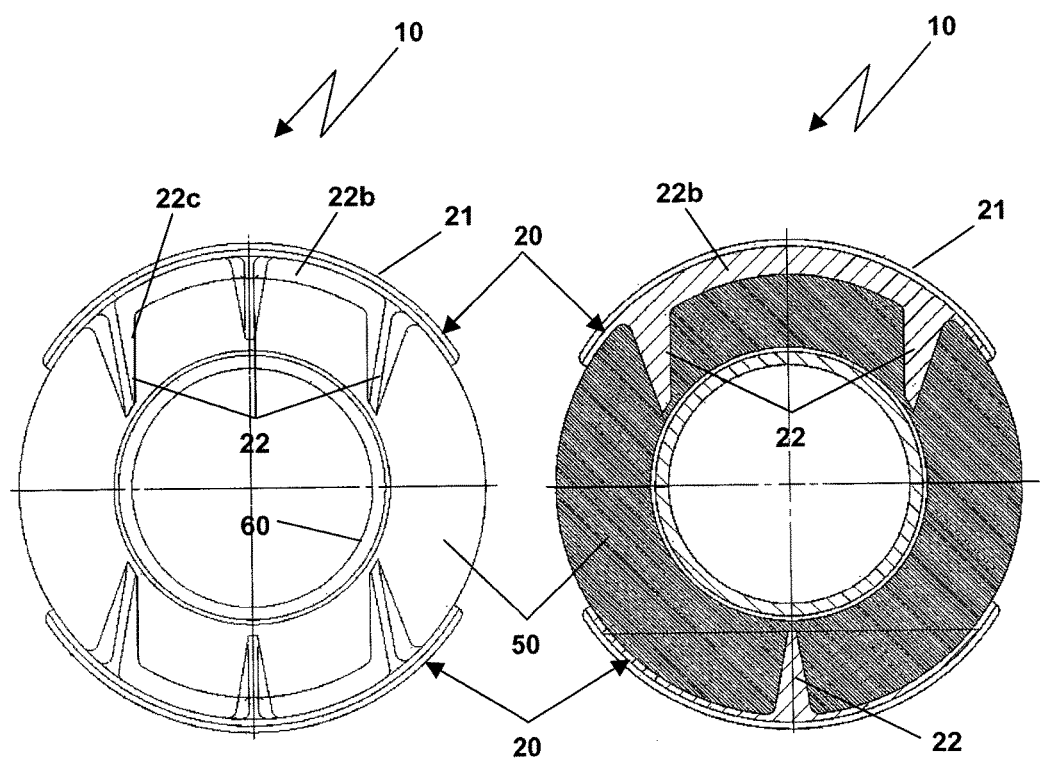
FIG. 3 shows a cross-section of the fixing system of FIG. 2, the insulation being transparently illustrated.
FIG. 4 shows a cross-section of the fixing system of FIG. 2.

As shown in FIGS. 2 to 4 the base plate units 20 are attached on the insulation material 50 from diametrically opposite sides such that the inner surface of the plate elements 21 contacts the outer surface of the insulation material 50. During the attachment the spikes 22 and the ribs 22a, 22b, 22c are pressed into the material of the insulation 50. The transversal ribs 22a of both base plate units 20 extend towards each other in radial direction.

In the upper half of FIG. 4 a cross-section of the fixing system 10 through the peripheral rib 22a is shown, whereas the lower half of FIG. 4 illustrates a cross-section of the fixing system through the spike 22.

As shown, the free ends of the spikes 22 end close to or at the inner surface of the insulation 50.

Figure 7:
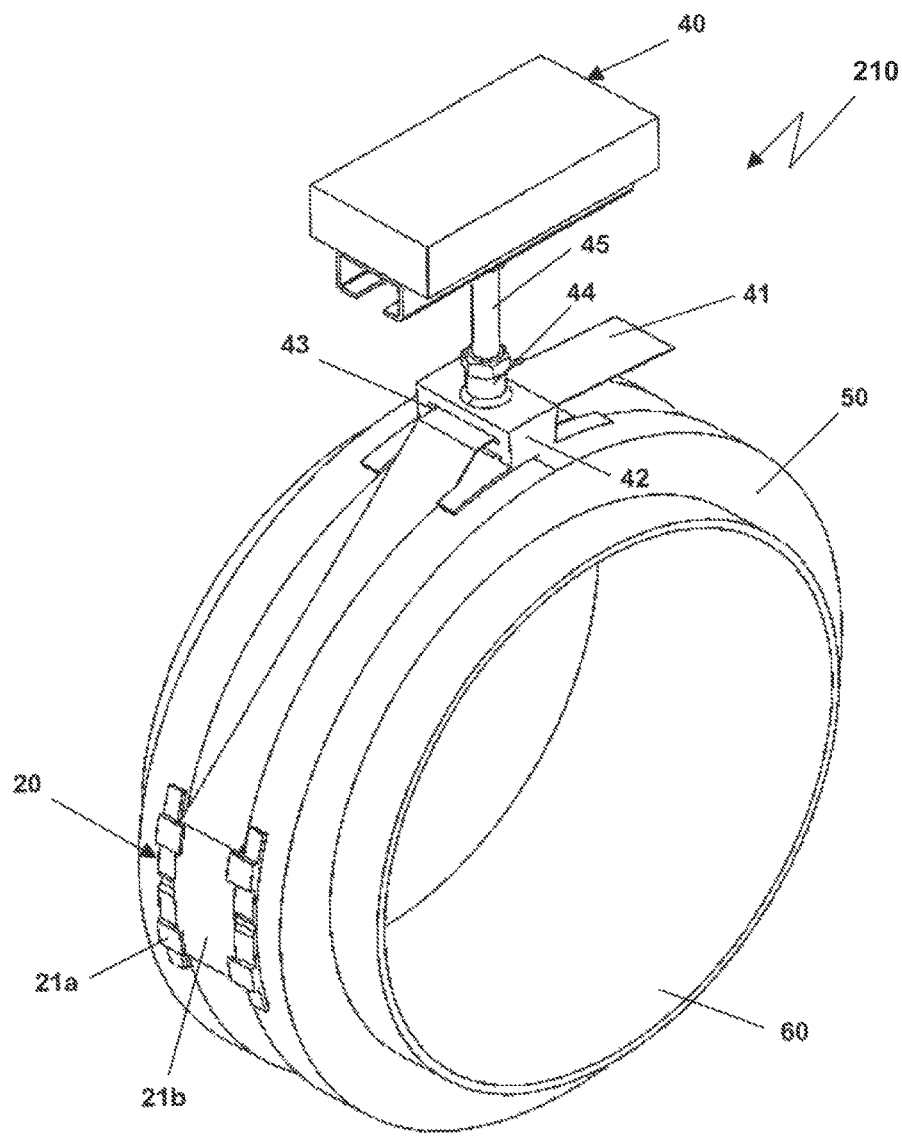
FIG. 7 shows a perspective view of the fixing system of FIG. 5.

FIGS. 5 to 7 show another embodiment of a fixing system 210. A pipe 60 axially extends through an insulation 50 having an annular cross-section. Four curved base plate units 20 are attached to the outer surface of the insulation 50 at an angular distance of 90°.

On the outer side of upper base plate unit 20 a captive head 42 is provided to which one end of a clamping strip 41 is attached. The clamping strip 41 surrounds the insulation 50 and runs through an extending groove 21b guided by guiding means 21a provided on the outer surfaces of the plate element 21 in peripheral direction. The free end of the clamping strip 41 is guided through an opening 43 in the captive head 42. In the opening 43 ratchet teeth are formed which engage in ratchet teeth formed on the clamping strip 41 when the clamping strip 41 is tightened around the insulation 50. During tightening of the clamping strip 41 pressure is exerted to the outer surface of the base plate units 20. Thereby, the spikes 22 of the base plate units 20 are pressed into the material of the insulation 50 as explained with regard to the embodiment of FIGS. 1 to 4. Between the base plate units 20 the clamping strip 41 is pressed into the insulation 50 as well.

On the outer upper side of the captive head 42 threading means 44 are provided having an internal thread into which an external thread of a bolt 45 engages, the latter forming a part of a fixing device 40 for attaching the fixing system to a wall, a ceiling etc.

As shown in FIGS. 8 and 9 a plate-like counter part 30 can be arranged on the other side of the insulation 50 opposite to the base plate units 20. The counter plate 30 comprises one plate element 31. On the surface facing the inner surface projecting pins 32 are provided having openings into which the spikes 22 engage. The surface of the counter part 30 remote from the insulation contacts the pipe 60. A corresponding counter part 30 can be used in the fixing system 10 of FIGS. 1 to 7 as well. As shown in FIG. 8 additional layers 70 can be added to the fixing system 10.

Figure 10:
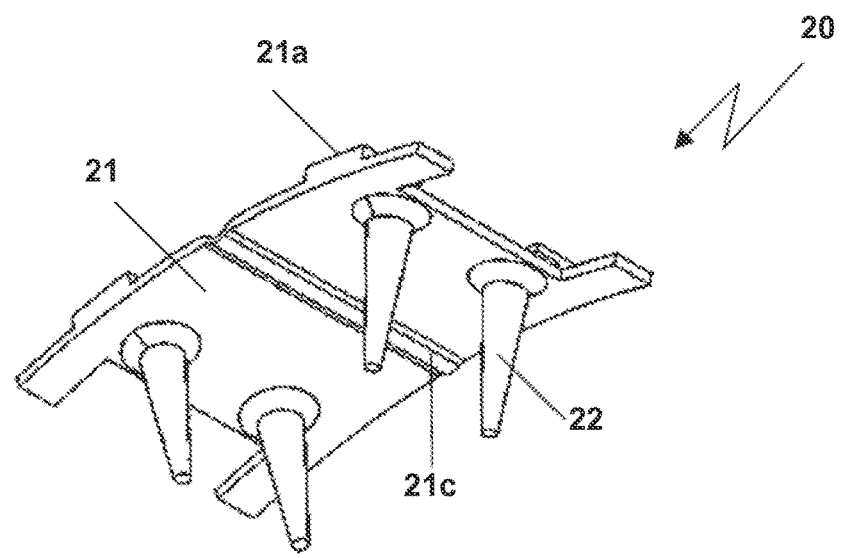
FIG. 10 shows a first embodiment of a base plate unit comprising a hinge.

FIG. 10 shows a first embodiment of a curved base plate unit 20 comprising a hinge 21c formed by a transverse depression in the middle of the outer surface of the plate element 21. Two spikes 22 are arranged on each side of the hinge 21c.

Figure 11:
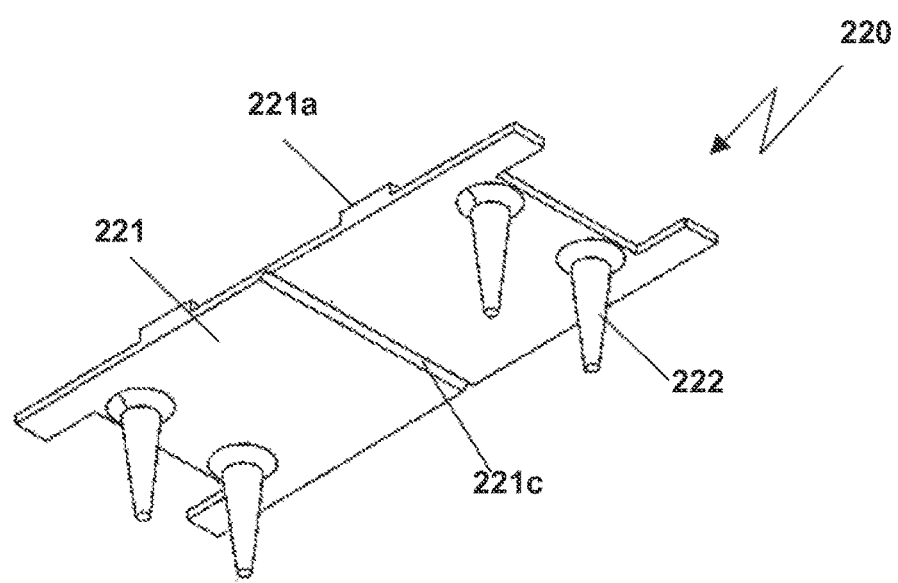
FIG. 11 shows a second embodiment of a base plate unit comprising a hinge.

FIG. 11 shows a second embodiment of a flat base plate unit 220 comprising a hinge 221c formed by a transverse depression in the middle of the inner surface of the plate element 221. Two spikes 222 are arranged on each side of the hinge 221c.

Figure 12:
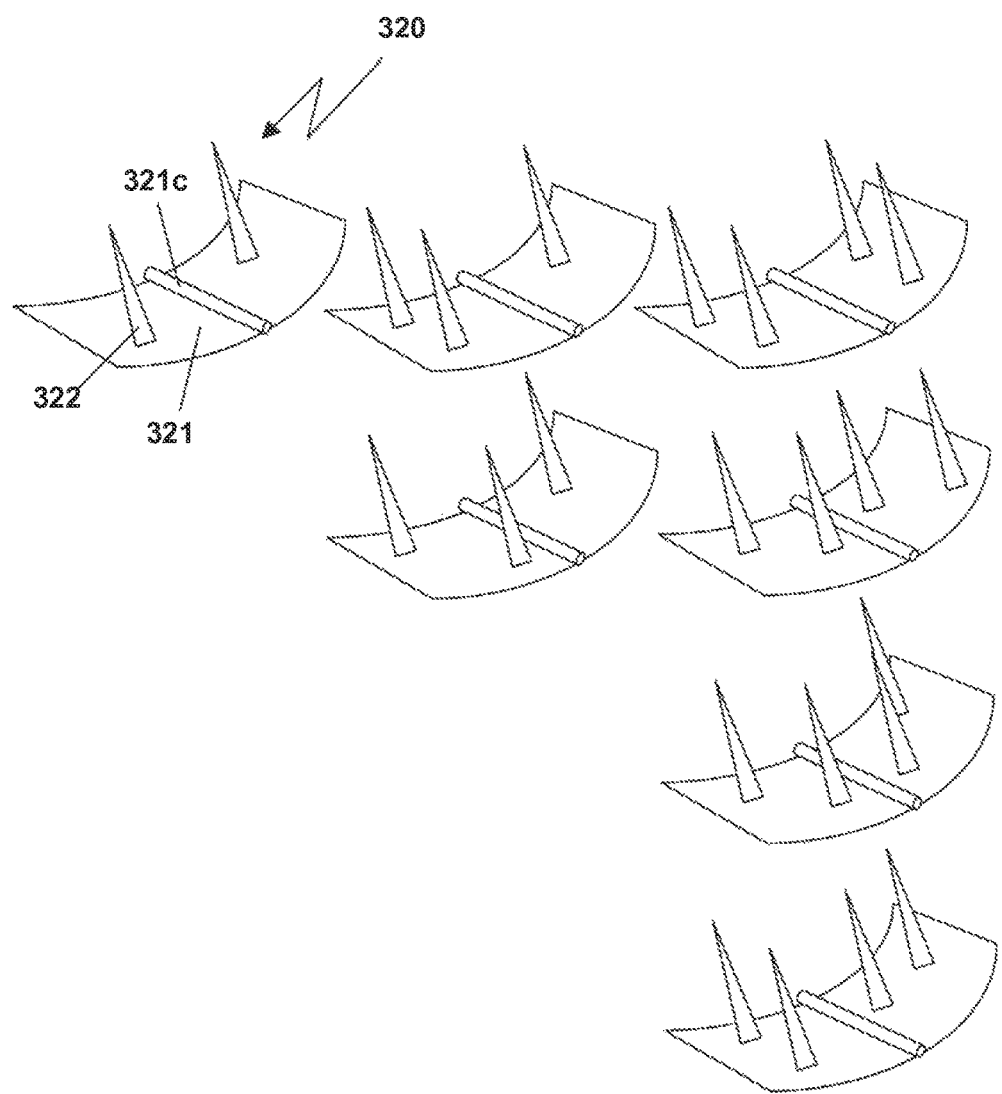
FIG. 12 shows several further embodiments of a base plate unit comprising a hinge.

FIG. 12 shows embodiments of base plate units 320 with a hinge comprising spikes 322 which are arranged in different ways.

Figure 13:
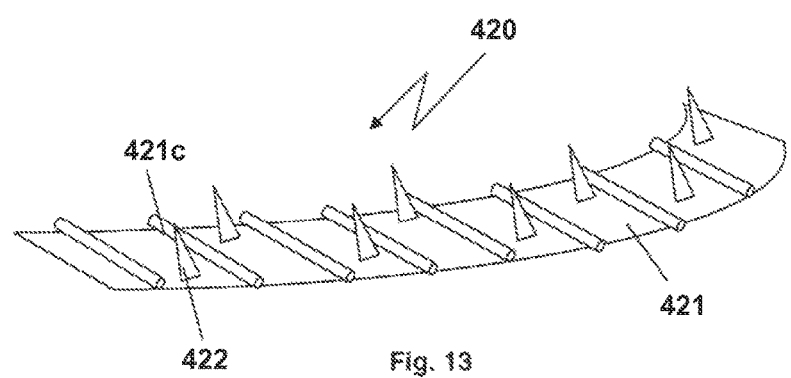
FIG. 13 shows a pre-fabricated strip from which base plate units comprising a hinge can be separated.

FIG. 13 shows a pre-fabricated base plate unit 420 in form of a strip comprising a plurality of hinges 421c and spikes 422 between adjacent hinges. From the strip base plate units 420 can be separated according to a desired length.

DETAILED DESCRIPTION OF THE INVENTION

The claimed fixing system 10 comprises at least one base plate unit 20 and an insulation material 50 and may additionally comprise one or more counter plates 30, a fixing device 40, an installation 60 and one or more additional layers 70.

The base plate unit 20 or preferably two base plate units 20 can be mounted on the inner or outer side, preferably on the outer side, of an insulation material 50, see FIG. 1. The base plate unit 20 comprises at least one plate element 21 with engaging elements 22. These engaging elements 22 can be formed by spines or spikes. In this case at least two, preferably at least three, especially preferred at least four spines or spikes 22 act both as spacer and fixation. Four spines or spikes 22 have shown to provide maximum stability of the installation in relation to the impact on WVT (see below and table 1).

The plate element 21 can be flat or curved at an angle between 20° and 180°. It may also comprise hinge(s) 21c. In the case of base plate units 20 showing hinges 21c the spines or spikes 22 preferably are present at both sides of the hinge 22c (see FIG. 12). It may also comprise guiding means/extending lands 21a and/or an extending groove 21b.

The base plate units 20 can be used as a stand-alone or in random combination, up to an infinite strip consisting of plate elements 421 being connected by hinges 421c or any other means (see FIG. 13). At least one, preferably at least two base plate units 20, are mounted on opposite sides of the installation 60 to be fixed (FIG. 1), or in equal distance to each other, respectively. The base plate units 20 may show cut-outs, recesses or milling grooves on at least one side to enable the applicant to use one plate system for more than one installation/insulation diameter, as e.g. several different diameters of pipe clamp or clip or fixing device 40 can be applied (see FIGS. 5-7). The plate element 21 therefore may also show extending grooves 21b to guide and fix the clamp (see FIGS. 2, 8, 9).

Figure 14:
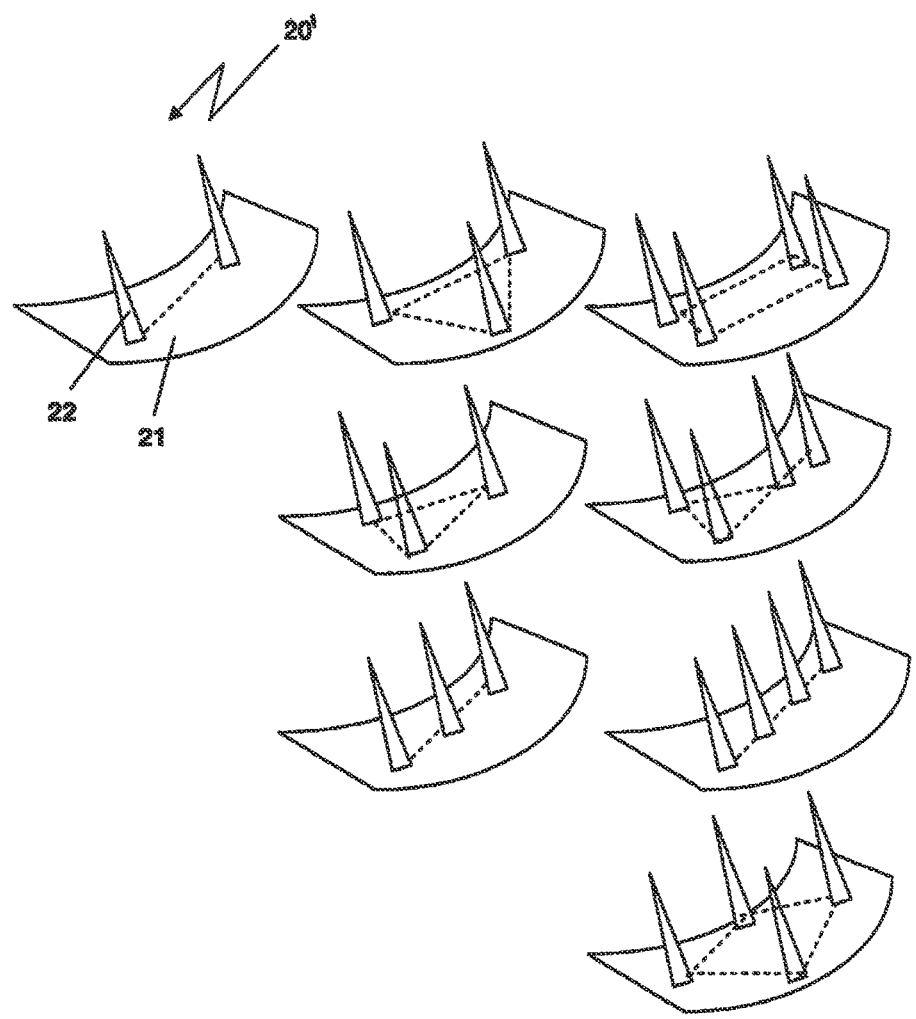
FIG. 14 shows several further embodiments of a curved base plate unit.

A preferred distribution of three spines or spikes 22 is triangular and of four spines or spikes 22 is rectangular or rhomboidal as shown on base plate 20' in FIG. 14. The length of the spines or spikes 22 is chosen appropriately to the thickness of the insulation 50 on the installation 60. As insulation thicknesses are more or less standardized worldwide (e.g. 13 mm/½", 19 mm/¾", 25 mm/1" etc.) this will reduce the number of essential items of the claimed system. It is not even necessary that all spines or spikes 22 will have to penetrate completely through the insulation 50, or that any spine or spike 22 will have to penetrate completely, depending on the insulation materials structural integrity and the intended tight or loose fit.

Therefore, the length of the spines or spikes 22 has to be from 5% to 200%, preferably from 40% to 150%, especially preferred from 50%-110% of the insulation layer thickness. Such longer or shorter spines or spikes 22 can compensate shrinkage and expansion of the insulation material 50, longer spines or spikes 22 can even be useful to fix additional layers 70, shorter spines or spikes 22 can be necessary due to the length of the projecting pins 32 of a counter plate 30 as well as due to reduction of impact on the insulation material.

The spines or spikes 22 can be of semi or fully circular, ellipsoid, rectangular, rhomboid or triangular cross-section and mixtures thereof and can show structured or smooth surfaces. Preferred is a smooth surface due to better applicability when mounted through an insulation material 50 (less friction).

Reinforcing structures such as ribs 22c or gills are preferably applied to the spines or spikes 22, as this will allow reducing the total cross-section surface which again will lead to less impact on WVT. Reinforcing structures such as peripheral 22b or transversal ribs 22a can also be applied between the spines or spikes 22 to provide lateral stability to the entire system. The peripheral rib 22b or transversal rib 22a extend at an angle about between 20° and 180°, preferably between 70° and 120°, around the insulation material 50.

The spines or spikes 22 can be of straight cylindrical or cone or pyramidal geometry. Preferred is cone or pyramidal geometry due to less impact on WVT and thermal conductivity, especially preferred is cone geometry. Typical and especially preferred spine or spike 22 configurations are shown in FIG. 14. The tips of the spines or spikes 22 may be pinnacled or radiused to reduce the contact area and may show further reduction of surface by applying structures, such as cuts etc. The tips of the spines or spikes 22 may be designed to follow the radius of the device to be fixed for obtaining maximum stability (see e.g. FIG. 3).

The plate element 21 may also show guiding means or extending lands 21a to facilitate mounting through insulations 50 as well as to keep the mounted part in optimum position and preventing the insulation material 50 from deformation of being pressed out or well forth. The function of the extending lands 21a can also be represented by reinforcing ribs 22c e.g. between the spines or spikes 22 (see FIG. 1). For achieving similar properties, the plate element 21 may also be equipped with an adhesive layer or may be glued to the insulation surface 50.

The plate element 21 may also show an integrated thread 44 for e.g. a threaded rod to enable the user of the claimed system to connect it to walls, ceilings etc. (see FIG. 5, 6) or to link it to another respective installation.

The plate element 21 and spines or spikes 22 and other parts of the base plate unit 20 can be made of massive or expanded thermoplastic and/or thermoset and/or metal material and/or any other material of appropriate structural integrity, preferably of plastics material (thermoplasts or thermosets).

The base plate unit 20 can be rigid or flexible (i.e. bendable) and can be manufactured by casting, edging, milling or moulding or any other three dimensional shaping method, preferably by injection moulding. To achieve best mechanical strength for threads an overmoulding of respective metal or other parts can be applied. The plate element 21 may furthermore show structures such as pinholes that would allow e.g. spines or spikes 22 of a counter plate 30 to snap in on the opposite side of the insulation material 50 (see FIG. 8,9).

The claimed embodiments of the base plate unit 20 will lead to a minimized impact on WVT of the claimed system (see table 1), as well as on thermal conductivity, as the spines or spikes 22 will only have very little contact with the installation 60 to insulate and will only cut out very little of the insulation material 50.

The claimed system may furthermore comprise an insulation material 50 which itself may comprise cellular material, such as expanded polymer (e.g. polyolefins, other thermoplasts, elastomers, thermoplastic elastomers, thermosets etc.) and/or other expanded material (metal/ceramic/silica gel/glass foams etc.) and/or fibrous insulation (mineral wool, glass wool etc.) or any combinations thereof. Preferred are materials that can be easily punched through by the insulation material 50, such as elastomeric or thermoplastic foams, and other widespread polymer based insulation including polyurethanes, PUR/PIR, polyesters, melamine, phenolics etc. Especially preferred are elastomeric and/or thermoplastic elastomer materials, such as based on or comprising ACM/AEM, AU/EU, BR, BIIR, CIIR, CM/CR, CSM/CSR, (G)(E)CO, EPM/EPDM, EVM, FKM/F(E)PM, GPO, IR, IIR, (V)MQ, (H)NBR, NR, SBR, T etc. The use of elastomers is also beneficial for the application as these materials are known for good water vapour transmission blocking properties. The insulation material 50 can be of mainly closed or open cell structure or mixed (open and closed) cell structure. Preferred are predominantly closed cell structures, especially with a closed cell content of at least 70%, preferably at least 80%, especially preferred at least 90%.

It may comprise one or more layers of expanded material, either in soft or rigid state, as full layer or as segments (FIG. 1, 2). Preferably, the insulation material 50 shows a thermal conductivity of less than 0.10 W/(m*K) at 0° C., preferably less than 0.045 W/(m*K) at 0° C. according to EN ISO 12667 (sheets) or EN ISO 8497 (tubes), and a density of less than 150 kg/m3, preferably less than 75 kg/m3 according to ISO 845, together with a WVT blocking (μ) value of at least 3000, preferably at least 5000, especially preferred at least 8000 according to EN 12086 (sheets) or EN 13469 (tubes).

The insulation material 50 may show surface structures on the installation 60 and/or base plate 20 side or in between individual layers of the insulation 50 to enhance thermal as well as acoustic decoupling.

The base plate unit 20 and the insulation material 50 may form a pre-insulated prefabricated part e.g. to be mounted on readily mounted installations 60 either by being pushed over the respective installation 60 or by being clamped around it. To achieve the latter, the insulation material 50 needs to be slit (see FIG. 2), preferably tangentially.

The base plate unit 20 can be connected to the insulation material 50 not only by mechanical means but also by applying adhesive. This will help closing possible gaps and stabilize the WVT blocking properties (see table 2).

The claimed system may furthermore comprise a fixing device 40 to connect at least one, preferably at least two pieces of base plate units 20 together onto the installation 60 to be clamped. The fixing device 40 may be made of metal, fabric or plastics and be of ribbon or belt shape, preferably acting as a clamp around the insulation 50 to be fixed or clamped. The fixing device 40 may also comprise a thread for e.g. mounting threaded rods.

The fixing device 40 may comprise one part with hinges 21c or two parts like a classic clamp or it may comprise a structured—e.g. embossed or notched or corrugated—belt or strip that will allow to easily fasten base plate units 20 onto various installations and through various insulation diameters by one device. For that purpose at least one base plate unit 20 may comprise a ratch(et), lever brace system or captive head 42 for letting snap in the clamping strip 41 at the desired geometry or diameter, respectively, see FIG. 7.

The number of base plate units 20 and the clamping force applied by the clamping strip 41 has to be chosen in a way to prevent the clamping strip 41 from being pressed into the insulation 50 in a way that the insulation effect is influenced considerably.

The claimed system may furthermore comprise parts that act as counterpart 30 to the base plate units 20 on the opposite side of insulation material 50 to ensure tight and good fit of the insulation material 50 (FIG. 5).

The counterpart 30 comprises one plate element 31. The plate element 31 can be flat or curved at an angle between 20° and 180°. It may also comprise hinge(s).

The counterpart 30 may show structures on the surface, such as projecting pins 32 or other features to fix or let the spines or spikes 22 of the base plate units 20 snap in. The counter plate 30 may also show other features as described already for the base plate units 20, such as spines or spikes 22, recesses, extending lands 21a etc.

The counterpart 30 may be made from metal, plastics etc., as described for the base plate unit 20, and can be manufactured as mentioned above. Preferred are plastic materials shaped by moulding.

A system comprising base plate units (20) punched through an insulation material (50) on or into a counter plate (30) or vice versa can also be used as pre-fabricated installation fixing or hanger as described above.

The combination of base plate units 20 with a counterpart 30 at the opposite side of the insulation material 50 will not only stabilize the whole construction, but also WVT blocking properties (see table 2). The counter plate 30 may be fixed to the base plate unit 20 and/or the insulation material 50 mechanically or by adhesives, which also will have a positive effect on vapour blocking (see table 2) as described for the base plate unit 20.

The claimed system furthermore may comprise additional layers 70 on at least one side of the insulation material 50, between respective individual layers of the insulation material and/or on the outside of the whole fixing system 10 (see FIG. 7, 8), e.g. as cladding. The additional layers 70 may have a decorative, protective or functional purpose, such as mechanical protection, WVT blocking etc. and may comprise foils, fabric, nonwoven etc. of metal, fibres, polymer based material, or any combinations thereof. The additional layers 70 may be glued to the insulation material 50 or be mechanically linked or be loosely mounted.

The claimed system furthermore may comprise other parts, such as included/overmoulded threading means 44, threaded rods, clamps etc. that will facilitate its mounting and use.

Preferred embodiments of the invention are:

a) A fixing system 10 for installations that require thermal and/or acoustic insulation, comprising at least one, preferably at least two base plate units 20, that can be mounted on the inner and/or outer side, preferably on the outer side, of an insulation material 50, comprising at least 1. a curved base plate unit 20 and/or
2. a flat base plate unit 220 and/or
3. a curved and/or flat base plate unit with at least one hinge 21c, and showing at least two, preferably at least three, especially preferred at least four spines or spikes 22 per base plate unit 20.

b) A system according to paragraph a) wherein the distribution of three spines or spikes 22 is triangular and the distribution of four spines or spikes is rectangular or rhomboidal.

c) A system according to any of paragraphs a) to b) wherein the spines or spikes 22 are semi or fully circular, ellipsoid, rectangular, rhomboid or triangular of shape in cross-section, or any combination thereof.

d) A system according to any of paragraphs a) to c) wherein the spines or spikes 22 are of straight cylindrical or cone or pyramidal geometry, or mixtures thereof. Preferred is cone or pyramidal geometry, especially preferred is cone geometry.

e) A system according to any of paragraphs a) to d) wherein reinforcing structures 22a, 22b, 22c are applied to the spines or spikes 22 and/or between the spines or spikes 22.

f) A system according to any of paragraphs a) to e) where the tips of the spines or spikes 22 are pinnacled and/or radiused and/or are designed to follow the radius of the installation 60 to be fixed.

g) A system according to any of paragraphs a) to f) wherein at least two base plate units 20 are mounted on opposite sides of the installation 60 to be fixed or in equal distance to each other, respectively.

h) A system according to any of paragraphs a) to g) wherein at least three base plate units 20 are mounted on the device to be fixed, preferably leading to a prefabricated interconnected belt of base plate units 20.

i) A system according to any of paragraphs a) to h) wherein the base plate units 20 show cut-outs, recesses or milling grooves on at least one side to use one type of plate system for more than one installation/insulation diameter.

j) A system according to any of paragraphs a) to i) wherein the base plate units 20 show extending grooves 21b to guide and fix a clamp or other fixing device 40 and/or the insulation material 50.

k) A system according to any of paragraphs a) to j) wherein the base plate units 20 show guiding means and/or extending lands 21a to facilitate mounting through insulations 50 as well as to keep the mounted part in optimum position and preventing the insulation material 50 from deformation of being pressed out or well forth.

l) A system according to any of paragraphs a) to k) wherein the plate element 21 is equipped with an adhesive layer or is adhered, preferably glued to the insulation material 50 surface.

m) A system according to any of paragraphs a) to l) wherein the plate element 21 shows an integrated fixing device for mounting or linking it to walls, ceilings or other installations.

n) A system according to any of paragraphs a) to m) wherein the base plate unit 20 is made of massive and/or expanded thermoplastic and/or thermoset and/or metal material, preferably of plastics material (thermoplasts or thermosets).

o) A system according to any of paragraphs a) to n) wherein the base plate unit 20 can be manufactured by casting, edging, milling or moulding, preferably by injection moulding.

p) A system according to any of paragraphs a) to o) wherein the plate element 21 shows mounting structures such as projecting pins 32, pinholes or spines or spikes 22 to fix a counterpart 30 to the base plate unit 20 enclosing the insulation material 50.

q) A system according to any of paragraphs a) to p) wherein an insulation material 50 is comprised which itself comprises at least one layer of cellular and/or fibrous material, preferred are cellular elastomeric materials.

r) A system according to paragraph q) wherein the insulation material 50 is of predominantly closed cell structure with a closed cell content of at least 70%, preferably at least 80%, especially preferred at least 90%.

s) A system according to any of paragraphs q) to r) wherein the insulation material 50 shows a thermal conductivity of less than 0.10 W/(m*K) at 0° C., preferably less than 0.045 W/(m*K) at 0° C. according to EN ISO 12667 (sheets) or EN ISO 8497 (tubes).

t) A system according to any of paragraphs q) to s) wherein the insulation material 50 shows a density of less than 150 kg/m3, preferably less than 75 kg/m3 according to ISO 845.

u) A system according to any of paragraphs q) to t) wherein the insulation material 50 shows a WVT blocking (μ) value of at least 3000, preferably at least 5000, especially preferred at least 8000 according to EN 12086 (sheets) or EN 13469 (tubes).

v) A system according to any of paragraphs q) to u) wherein the insulation material 50 shows surface structures on at least one side of at least one layer of the insulation material 50 to enhance thermal as well as acoustic decoupling.

w) A system according to any of paragraphs a) to v) wherein the base plate unit 20 and the insulation material 50 form a pre-insulated prefabricated part preferably to be mounted on readily mounted installations 60 either by being pushed over the respective installation 60 or by being clamped around it.

x) A system according to paragraph w) where the insulation material 50 is slit, preferably tangentially, to enable clamping the base plate unit 20/the insulation material 50 prefabricated part around the installation 60.

y) A system according to any of paragraphs a) to x) wherein a fixing device 40 is comprised to connect at least one, preferably at least two pieces of the base plate unit 20, together onto the insulation 50 to be clamped and where the fixing device 40 is made of metal or fabric and is of ribbon or belt shape, acting as a clamp around the insulation to be fixed or clamped. The fixing device 40 preferably comprises at least one part with hinges 21c or at least two parts analogous to a classic clamp and preferably comprises a thread 44.

z) A system according to paragraph y) wherein the fixing device 40 comprises a structured—e.g. embossed or notched or corrugated—belt or strip 41 to ratchet fasten base plate units 20 onto the insulation material 50.

aa) A system according to paragraph z) wherein at least one base plate unit 20 comprises a ratch(et) or lever brace system 42 to let the fixing device 40 snap in at the desired geometry or diameter, respectively, of the installation 60 to be fixed.

bb) A system according to any of paragraphs a) to z) and aa) wherein counterparts 30 to the base plate unit 20 on its opposite side of the insulation material 50 are comprised and where the counter plate 30 preferably shows structures on the surface, such as pinholes or spines or spikes 22, to fix the counter plate 30 to the base plate unit 20 through the insulation material 50 or vice versa, and wherein the base plate unit 20 preferably is punched through an insulation material 50 on or into the counter plate 30 to form a pre-fabricated fixing or hanger, and where the counter plate 30 is connected to the insulation material 50 and/or the base plate unit 20 by mechanical means and/or by applying adhesive.

cc) A system according to any of paragraphs a) to z) and aa) to bb) wherein additional layers 70 of decorative, protection or functional purpose are applied on a least one side of the insulation material 50 or between respective individual layers of the insulation material 50.

dd) The system according to any of paragraphs a) to z) and aa) to cc) is preferably used as a fixing device, hanger or link for fixing and/or connecting installations 60 which require acoustic and/or thermal insulation, in indoor and outdoor use.

It is a prominent advantage of the claimed system that it is providing reliable and sustainable thermal insulation and acoustic damping no matter if it is mounted on pre-insulated installation or if it is applied together with the insulation.

Another basic advantage of the claimed system is the fact that the fixing system can be easily mounted on readily insulated installations.

It is a further advantage of the claimed system that it can be easily applied, removed or (ex)changed during operation.

It is an additional advantage of the claimed system that—depending on the choice of insulation material—it may safely be applied at a wide temperature.

It is a related advantage of the claimed system that it will allow to use manifold materials both for insulation and fastening, and that it allows to adapt its properties to the desired property profile (concerning insulation, mechanical resistance etc.).

Another basic advantage of the claimed system is the fact that it is extraordinarily versatile and easy, thus fast and economic, in mounting and demounting, and that it does not require special manipulations or skills.

It is a further advantage of the claimed system that it can be used indoors as well as outdoors.

It is a prominent advantage of the claimed system that its individual parts can be produced in a very economic manner and that the final versions of the system can be assembled economically, too.

It is a further advantage of the claimed system that one type can cover a broad range of installation geometries and diameters to be fixed and therefore it is not necessary to have a large number of the system available neither for the user nor for the members of the supply chain.

It is a further prominent advantage of the claimed system that it is non corrosive and not abrasive and therefore the claimed material can be mounted even on critical substrates.

Another prominent advantage of the claimed system is its good vapour barrier property provided by the insulation part and the minimized impact of the base plate unit 20.

It is another advantage of the claimed system that it has excellent thermal insulation properties, depending on the insulation layer. The disclosed preferred geometries of the spines or spikes will support this effect.

It is an additional advantage of the claimed system that the entire thermal insulation is only minimally affected by the plate/spine combination.

It is a further advantage of the claimed system that its base plate/spine combination will lead to both thermal and acoustic decoupling of the insulated installation from the supporting structure.

It is a further advantage of the claimed system that it provides a high level of stability combined with low weight.

It is a further advantage of the claimed system that it can be used as a multi-piece kit on site or as prefabricated part or in any configuration in between.

EXAMPLES

For the following example tubes of 19 mm and 25 mm thickness and various inner diameters had been chosen from the market for insulation (AF=AF/Armaflex® and HT=HT/Armaflex®, both Armacell, Germany).

Example 1

The tubes have been applied with two base plate 20/spine 22 combinations each as shown in table 1 and then tested for water vapour transmission according to EN 12086 (sheets) or EN 13469 (tubes). The values were detected at least three times per item. Table 1 shows the respective combinations of the respective materials and the averaged μ values. The plate element/spine fixing devices were obtained from polyoxymethylene (POM) resin by injection moulding.

TABLE 1

Combinations of plate element 21/spine 22 with insulation foams 50 and resulting μ values

| | μ value for base plate with X spines or spikes | | | | | |
|---|---|---|---|---|---|---|
| | X = 2 | X = 3 | X = 4 | X = 5 | X = 6 |
| AF | 10000 | 8600 | 7500 | 6400 | 5300 | 4100 |
| HT | 6500 | 6100 | 5600 | 5200 | 4100 | 2800 |
| remarks | Comparison values of pure foams | Rather instable when mounted | Acceptable fastening | Excellent fastening | Excellent fastening | Excellent fastening |

Example 2

The plate element 21 with four spines or spikes 22 has been chosen as best in stability performance/WVT properties and has been examined for WVT also in bond state (glued to the foam with Armaflex® 520 adhesive from Armacell, Germany) and/or with a counterpart plate 30. Table 2 shows the results.

TABLE 2

μ values of combinations using a four spike 22 base plate 20

| | Base plate only | Base plate glued | Base plate with counter plate | Base plate + counter plate glued |
|---|---|---|---|---|
| AF | 10000* | 6400 | 6800 | 6700 | 7000 |
| HT | 6500* | 5200 | 5500 | 5500 | 5600 |

*Comparison values of pure foam

The invention claimed is:
1. A fixing system for installations, the fixing system comprising at least two base plate units mounted on an outer surface of an insulation material having an annular cross section, each base plate unit further including:
a plate element having a curvature and extending peripherally around the outer surface of the insulation material;
a peripheral rib formed on an inner side of the plate element;
a transversal rib formed on the inner side of the plate element and extending perpendicularly to the peripheral rib, wherein the peripheral rib and the transversal rib form a cross shape;
at least two engaging elements extending from the plate element and supported by the peripheral rib and the transversal rib, the at least two engaging elements formed by spikes, the at least two engaging elements each further including a plurality of reinforcing ribs and wherein the peripheral rib and the transversal rib each extend between engaging elements of the at least two engaging elements; and
two guiding elements formed at opposite edges of the plate element to form a peripherally extending groove between the two guiding elements;
wherein:
the at least two base plate units are mounted around a circumference of the insulation material,
the at least two engaging elements penetrate into the insulation material, and each engaging element has a length of 40% to 150% of a thickness of the insulation material, and
each of the at least two base plate units and the corresponding at least two engaging elements form one integral part.

2. The fixing system according to claim 1, wherein the insulation material comprises at least one layer of at least one of a cellular material and a fibrous material.

3. The fixing system according to claim 1, wherein on at least one side of at least one layer of the insulation material, surface structures are provided for enhancing thermal as well as acoustic decoupling.

4. The fixing system according to claim 1, wherein at least one base plate unit of the at least two base plate units and the insulation material form a pre-insulated prefabricated part.

5. The fixing system according to claim 1, wherein the insulation material is slit to enable arranging a prefabricated part around an installation.

6. The fixing system according to claim 1, wherein a clamp strip is provided for clamping the insulation material to a pipe via at least one base plate unit of the at least two base plate units.

7. The fixing system according to claim 6, wherein the clamp strip comprises a longitudinal strip or a belt-like clamping element configured for clamping the insulation material to the pipe via the at least one base plate unit of the at least two base plate units.

8. The fixing system according to claim 1, wherein a counterpart is arranged on a side of the insulation material opposite to a side where the at least two base plate units are attached, the counterpart comprising means which are engaged by the at least two engaging elements extending through the insulation material.

9. The fixing system according to claim 1, wherein the at least two base plate units are four base plate units mounted on the insulation material at an angular distance of 90°.

10. The fixing system according to claim 1, wherein at least one of the peripheral rib and the transversal rib extends at an angle between 20° and 180° around the insulation material.

11. The fixing system according to claim 1, wherein at least one of the peripheral rib and the transversal rib extends at an angle between 70° and 120° around the insulation material.

\* \* \* \* \*